US011996638B2

(12) United States Patent
Doumanis et al.

(10) Patent No.: US 11,996,638 B2
(45) Date of Patent: May 28, 2024

(54) ANTENNA SYSTEM

(71) Applicant: NOKIA SOLUTIONS AND NETWORKS OY, Espoo (FI)

(72) Inventors: Efstratios Doumanis, Helsinki (FI); Murat Emre Ermutlu, Helsinki (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/533,418

(22) Filed: Nov. 23, 2021

(65) Prior Publication Data

US 2022/0166133 A1 May 26, 2022

(30) Foreign Application Priority Data

Nov. 24, 2020 (FI) .................................... 20206196

(51) Int. Cl.
*H01Q 5/335* (2015.01)
*H01Q 9/04* (2006.01)

(52) U.S. Cl.
CPC .......... *H01Q 9/0485* (2013.01); *H01Q 5/335* (2015.01)

(58) Field of Classification Search
CPC ..... H01Q 9/0407; H01Q 9/0485; H01Q 5/335
See application file for complete search history.

(56) References Cited

U.S. PATENT DOCUMENTS 6,297,776 B1 10/2001 Pankinaho
8,860,532 B2 10/2014 Gong et al.
2002/0180646 A1 12/2002 Kivekas et al.
2004/0080457 A1 4/2004 Guo et al.
2004/0160380 A1* 8/2004 Simpson .................. H01Q 9/38 343/846
2005/0270243 A1 12/2005 Caimi et al.
2007/0139277 A1 6/2007 Nissinen et al.
2008/0165063 A1 7/2008 Schlub et al.
2019/0229424 A1 7/2019 Leung et al.
2020/0028231 A1* 1/2020 Leung ...................... H01Q 1/38
(Continued)

FOREIGN PATENT DOCUMENTS

CN 1389954 A 1/2003
CN 1972008 A 5/2007
(Continued)

OTHER PUBLICATIONS

Doddipalli et al., "Compact UWB Antenna with Integrated Triple Notch Bands for WBAN Applications", IEEE Access, vol. 7, (Dec. 17, 2018), 8 pages.

(Continued)

*Primary Examiner* — Daniel Munoz
(74) *Attorney, Agent, or Firm* — ALSTON & BIRD LLP

(57) ABSTRACT

An antenna system comprising: a ground plane; an antenna radiator separated from and overlapping the ground plane; at least one feed element configured to provide a radio-frequency feed for the antenna radiator; and at least one resonator coupled to the feed element and positioned in a space between the ground plane and the antenna radiator, wherein the antenna radiator is a broadband antenna radiator having a first operational range of frequencies and the resonator is a narrow band resonator having a second range of resonant frequencies that at least partially lie within the first operational range of frequencies.

20 Claims, 3 Drawing Sheets

(56) References Cited

U.S. PATENT DOCUMENTS

| | | | |
|---|---|---|---|
| 2020/0212552 | A1 | 7/2020 | Zhu et al. |
| 2020/0227829 | A1 | 7/2020 | Jouanlanne |

FOREIGN PATENT DOCUMENTS

| | | | |
|---|---|---|---|
| CN | 102130376 | A | 7/2011 |
| EP | 0587247 | A1 | 3/1994 |
| EP | 0871238 | A2 | 10/1998 |
| EP | 3734757 | A1 | 11/2020 |
| JP | H1127034 | A | 1/1999 |
| KR | 20100098197 | A | 9/2010 |
| WO | WO 2020/025182 | A1 | 2/2020 |

OTHER PUBLICATIONS

Office Action and Search Report for Finland Application No. 20206196 dated Mar. 10, 2021, 8 pages.

Extended European Search Report for European Application No. 21208730.8 dated Apr. 20, 2022, 11 pages.

Fakhte et al., "A High Gain Dielectric Resonator Loaded Patch Antenna", Progress in Electromagnetics Research C, vol. 30, (Jun. 16, 2012), 12 pages.

Kumari et al., "Circularly Polarized Dielectric Resonator Antennas: Design and Developments", Wireless Personal Communications, vol. 86, (Jul. 28, 2015), 36 pages.

Li et al., "Integrated Single-Fed Circularly-Polarized Patch Antennas with High-Q Cavity Filters", 2014 IEEE Antennas and Propagation Society International Symposium (APSURSI), (Jul. 6-11, 2014), 2 pages.

Office Action for Chinese Application No. 202111396744.6 dated Jan. 6, 2024, 12 pages.

* cited by examiner

ANTENNA SYSTEM

CROSS REFERENCE TO RELATED APPLICATIONS

This application claims priority to Finnish Application No. 20206196, filed Nov. 24, 2020, the entire contents of which are incorporated herein by reference.

TECHNOLOGICAL FIELD

Embodiments of the present disclosure relate to an antenna system.

BACKGROUND

Antenna systems are commonly used in telecommunication for efficiently transmitting and/or receiving radio waves in an operational range of frequencies (operational bandwidth).

The operational bandwidth may be defined as where the return loss (S-parameter reflection coefficient S11) of the antenna system is below an operational threshold and where an efficiency (gain) of the antenna system is above an operational threshold.

BRIEF SUMMARY

According to various, but not necessarily all, embodiments there is provided an antenna system comprising: a ground plane; an antenna radiator separated from and overlapping the ground plane; at least one feed element configured to provide a radio-frequency feed for the antenna radiator; at least one resonator coupled to the feed element and positioned in a space between the ground plane and the antenna radiator, wherein the antenna radiator is a broadband antenna radiator having a first operational range of frequencies and the resonator is a narrow band resonator having a second range of resonant frequencies that at least partially lie within the first operational range of frequencies.

In some but not necessarily all examples, the antenna system has, at the at least one feed, a gain that is low for the second range of frequencies and high for at least a portion of the first operational range of frequencies that does not overlap the second range of frequencies.

In some but not necessarily all examples, the at least one resonator is coupled to the antenna radiator at a position closer to a center of the antenna radiator than an edge of the antenna radiator.

In some but not necessarily all examples, the antenna radiator comprises a planar conductive portion and the at least one resonator is coupled to the antenna radiator at a position midpoint along a longest bi-sector of the planar conductive portion.

In some but not necessarily all examples, the resonator is coupled to the antenna radiator at a current minimum for the first operational range of frequencies.

In some but not necessarily all examples, the space between the ground plane and the antenna radiator occupied by the at least one resonator has a height dimension between the ground plane and the antenna radiator that is less than $1/20^{th}$ a wavelength corresponding to a center frequency of the first operational range of frequencies.

In some but not necessarily all examples, the at least one resonator is coupled between the ground plane and the antenna radiator.

In some but not necessarily all examples, the at least one resonator is configured for efficient filtering of unwanted frequencies close to wanted frequencies within the first operational range of frequencies, without adversely affecting efficiency of the antenna radiator at the wanted frequencies within the first operational range of frequencies.

In some but not necessarily all examples, the at least one resonator is configured as a bandstop resonator.

In some but not necessarily all examples, the at least one resonator reduces antenna gain at frequencies within the second range of resonant frequencies.

In some but not necessarily all examples, the at least one resonator comprises an annulus of dielectric.

In some but not necessarily all examples, the annulus of dielectric is a dielectric gap between two partially overlapping, concentric hollow cylindrical conductors of different diameter or is one hollow cylinder of dielectric material or materials that interconnects the ground plane and the antenna radiator.

In some but not necessarily all examples, the antenna radiator is a planar conductor and wherein the ground plane comprises a planar conductor, wherein a plane occupied by the planar conductor of the antenna radiator is parallel to a plane occupied by the planar conductor of the ground plane.

In some but not necessarily all examples, the antenna radiator is a patch antenna.

In some but not necessarily all examples, a radio network access node comprises one or more of the antenna systems.

In some but not necessarily all examples, a portable electronic device comprises one or more of the antenna systems.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
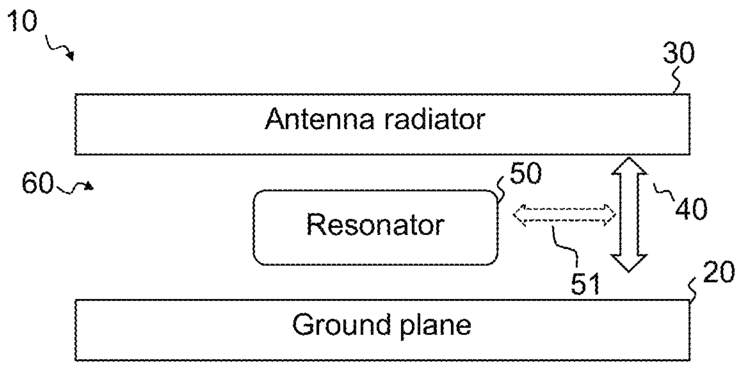
FIG. 1 shows an example of the subject matter described herein.

FIG. 1 illustrates an example of an antenna system 10. The antenna system 10 can be used to transmit and/or receive radio waves.

The antenna system 10 comprises: a ground plane 20; an antenna radiator 30; a feed element 40; and a resonator 50 coupled 51 to the feed element 40.

The feed element 40 is configured to provide a radio-frequency feed for the antenna radiator 30.

The antenna radiator 30 is separated from and overlapping the ground plane 20. There is a space 60 between the ground plane 20 and the antenna radiator 30. The resonator 50 is positioned in the space 60 between the ground plane 20 and the antenna radiator 30.

The antenna radiator 30 is a broadband antenna radiator having a first operational range of frequencies ΔF1.

The resonator 50 is a narrow band resonator having a second range of resonant frequencies ΔF2 that at least partially lie within the first operational range of frequencies ΔF1.

An operational range of frequencies (operational bandwidth) of the antenna radiator 30 may be defined as where the return loss S11 of the antenna radiator 30 is below an operational threshold T1 and where an efficiency (gain) of the antenna radiator 30 is above an operational threshold T2.

Figure 3A:
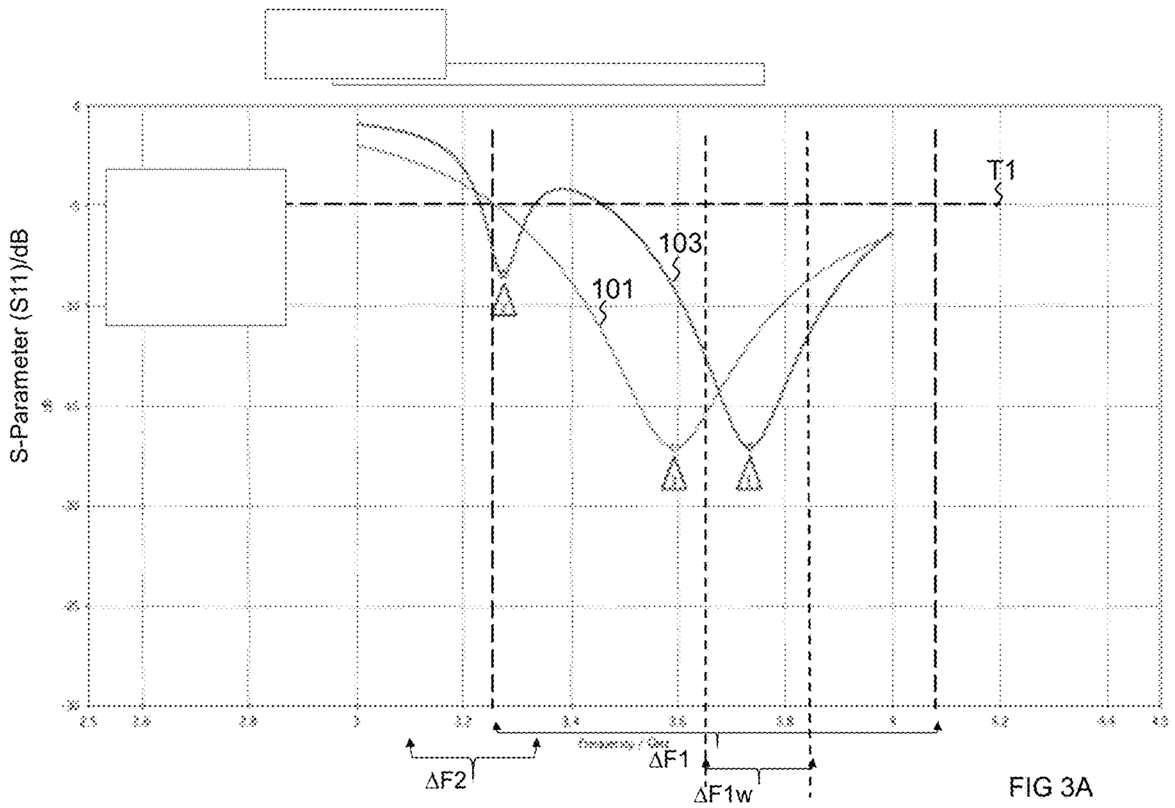
FIGS. 3A and 3B show another example of the subject matter described herein.

FIG. 3A illustrates an example of a plot of return loss S11 for the antenna radiator 30, with the resonator 50 in the antenna system 10 (plot 103) and a plot of return loss S11 for the antenna radiator 30 without the resonator 50 (plot 101). The operational threshold T1 is, in this example, 5 dB (this value can be changed).

Figure 3B:
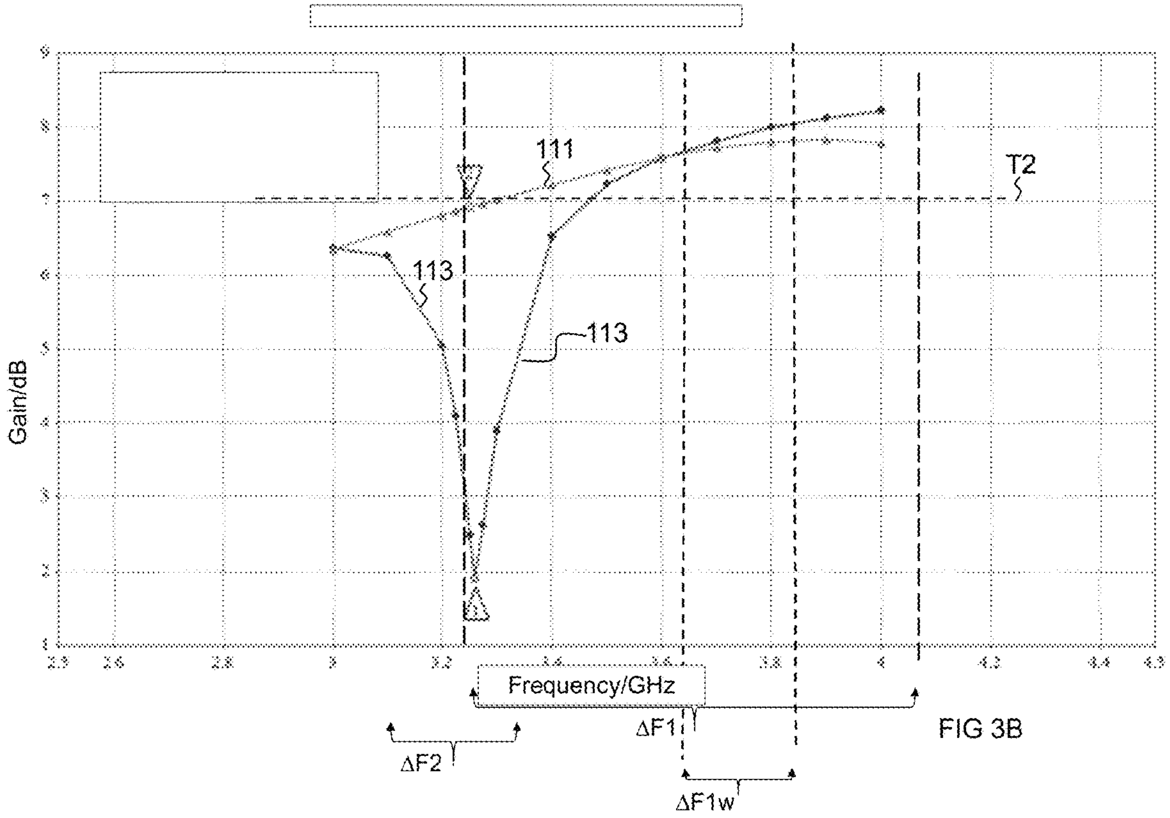

FIG. 3B illustrates an example of a plot of maximum gain for the antenna radiator 30, with the resonator 50 in the antenna system 10 (plot 113) and without the resonator 50 (plot 111). The operational threshold T2 is, in this example, 7 dB (this value can be changed).

The antenna radiator 30 is a broadband antenna radiator having, without the resonator 50, a first operational range of frequencies ΔF1 over which the return loss S11 of the antenna radiator 30 is below the operational threshold T1 and the efficiency (gain) is greater than the operational threshold T2.

The resonator 50 is a narrow band resonator having a second range of resonant frequencies ΔF2 that at least partially lie within the first operational range of frequencies ΔF1.

The resonator 50 causes the antenna system 10, in which the resonator 50 is coupled 51 to the feed element 40, to have a narrower operational range of frequencies (compared to the first operational range of frequencies ΔF1) over which the return loss S11 of the antenna system 10 is below the operational threshold T1 and the efficiency (gain) of the antenna system 10 is above the operational threshold T2. The narrower operational range of frequencies for the antenna system 10 includes a wanted range of frequencies ΔF1*w*.

In the antenna system 10, the at least one resonator 50 is configured for efficient filtering of unwanted frequencies close to wanted frequencies ΔF1*w* within the first operational range of frequencies ΔF1, without adversely affecting efficiency of the antenna radiator 30 at the wanted frequencies ΔF1*w* within the first operational range of frequencies ΔF1. The gain is low for the second range of resonant frequencies ΔF2 and high for at least a portion ΔF1*w* of the first operational range of frequencies that does not overlap the second range of resonant frequencies ΔF2.

In at least some examples, the resonator 50 is configured as a bandstop resonator. The resonator 50 can, for example, be configured as a wave (antenna) trap.

The resonator 50 is a filter and is not an antenna radiator (antenna resonator). The resonator 50 is not designed to be a radiator of radio frequency energy. The resonator 50 is designed to filter radio frequency signals which are distributed on the antenna radiator 30.

The resonator 50 blocks, at selected frequencies ΔF2, feeding of the antenna radiator 30. The resonator 50 resonates at the one or more natural resonant frequencies ΔF2 but is not capable of efficient radiation in the far field at those frequencies (low radiation efficiency). The antenna radiator 30 is capable of band stop efficient radiation in the far field of the operational range of frequencies ΔF1 (high radiation efficiency). However, the antenna radiator 30 in the presence of the resonator 50 coupled 51 to the feed element 40, is no longer capable of efficient radiation in the far field of the range of resonant frequencies ΔF2 (high radiation efficiency for ΔF1*w*, low for ΔF2).

Considering the antenna system 10 as a filter and antenna combined (this is not to be confused with a filtenna) the at least one resonator 50, in at least some examples, reduces antenna gain at frequencies within the second range of resonant frequencies ΔF2. The resonator 50 suppresses radiation of the antenna radiator 30 for at least the second range of frequencies ΔF2.

In at least some examples, the resonator 50 has a high quality (Q) factor. The Q factor is the ratio of the stored energy to the energy dissipated per radian of oscillation, at the resonant frequency. The Q factor can for example be a value above 1000.

Any suitable component or arrangement can be used as the resonator 50 so long as it is compact enough to fit in the space 60.

It should be appreciated that the ground plane 20 is the local ground (earth) of the antenna system 10, commonly referred to as the 'ground plane' in the technical field. The term 'plane' does not necessarily mean that the ground plane 20 is planar or flat.

In this example and the following examples, a single feed element 40 is described and illustrated. However, in other examples there are multiple feed elements 40. In this example and the following examples, a single resonator 50 is described and illustrated. However, in other examples there can be multiple resonators 50. In some examples, the multiple feed element(s) are used for different frequencies and/or the multiple resonators 50 are configured for different frequencies. The multiple resonators 50 can be located in the space 60 between the ground plane 20 and the antenna radiator 30 and be coupled 51 to the one or more feed elements 40 at different locations.

It will therefore be appreciated that in this and the following examples, the antenna system 10 comprises: a ground plane 20; an antenna radiator 30 separated from and overlapping the ground plane 20; at least one feed element 40 configured to provide a radio-frequency feed for the antenna radiator 30; and at least one resonator 50 coupled 51 to the feed element 40 and positioned in a space 60 between the ground plane 20 and the antenna radiator 30.

In at least some examples, the antenna radiator 30 is a broadband antenna radiator having a first operational range of frequencies ΔF1 and the resonator 50 is a narrow band resonator having a second range of resonant frequencies ΔF2 that at least partially lie within the first operational range of frequencies ΔF1.

The resonator 50 can be coupled 51, in addition to the feed element 40, to the ground plane 20 (or other reference potential) and/or the antenna radiator 30. In the example illustrated in FIG. 2, but not necessarily all examples, the potential reference is the ground plane 20.

The coupling 51 to any one or more of the feed element(s) 40, the ground plane 20 (if coupling 51 present) and/or the antenna radiator 30 (if coupling 51 present) can be configured for non-contact (electromagnetic) coupling or for contact (galvanic) coupling.

Figure 2:
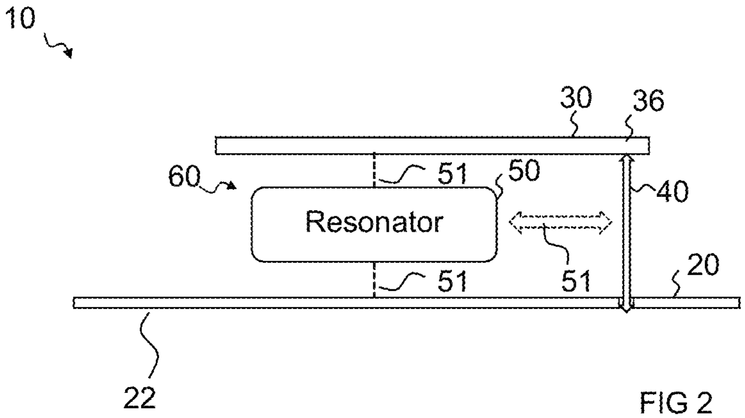
FIG. 2 shows another example of the subject matter described herein.

FIG. 2 illustrates an example of the antenna system 10 as described previously.

In this example, the at least one resonator 50 is coupled 51 to the feed element 40 and the ground plane 20, and is positioned in the space 60 between the ground plane 20 and the antenna radiator 30. The resonator 50 is, in this example, coupled 51 between the ground plane 20 and the antenna radiator 30.

In this example, but not necessarily all examples, the antenna radiator 30 is or comprises a planar, or substantially planar conductor 36 and henceforth is referred to as a planar antenna radiator 30.

In this example, but not necessarily all examples, the ground plane 20 comprises or is a planar, or substantially planar conductor 22 and henceforth is referred to as a planar ground plane 20.

In some examples, the antenna radiator 30 is not planar. For example, the antenna radiator 30 can be partially curved or partially angled in one or more directions or can be curved or angled in one or more directions. In some examples, the antenna radiator 30 can be part of a housing of a portable device and follow the contours of the housing.

In some examples, the ground plane 20 is not planar. For example, the ground plane 20 can be partially curved or partially angled in one or more directions or can be curved or angled in one or more directions. In some examples, the ground plane 20 can be part of a housing of a portable device and/or follow the contours of the housing.

In the example illustrated, a plane occupied by the planar conductor 36 of the planar antenna radiator 30 is parallel (or substantially parallel) to a plane occupied by the planar conductor 22 of the planar ground plane 20.

The planar antenna radiator 30 is separated from and overlapping the planar ground plane 20 forming the space 60 occupied by the resonator 50. The planar antenna radiator 30 and the planar ground plane 20 can be partially overlapping. For example, a portion, for example a minority portion, of the antenna radiator 30 could extend beyond a perimeter of the ground plane 20. For example, a portion (for example a majority portion, of the ground plane 20 could extend beyond a perimeter of the antenna radiator 30.

The planar antenna radiator 30 can, for example, form a microstrip transmission line antenna.

For example, the antenna radiator 30 can be a patch antenna. In the example illustrated the antenna radiator 30 can be a single patch antenna. In the example illustrated the patch, the planar conductor 36, has an electrical length (in free space) of substantially half a wavelength at the wanted frequencies ΔF1*w*.

In some examples, the planar conductor 36 is formed from metal.

In this example, the feed 40 passes through the ground plane 20 without making galvanic contact with the ground plane 20 and extends to the antenna radiator 30. In this example, but not necessarily all examples, the feed 40 makes galvanic (DC) contact to the antenna radiator 30. In other examples, the feed 40 does not make galvanic (DC) contact to the antenna radiator 30 but instead capacitively feeds the antenna radiator 30.

In this example, the at least one resonator 50 is galvanically connected to the antenna radiator 30 and also to the ground plane 20. The resonator 50 is galvanically connected between the ground plane 20 and the antenna radiator 30. A galvanic connection is a connection through which a direct electric current can flow.

In this example, the at least one resonator 50 has a galvanic connection to the antenna radiator 30 and a galvanic connection to the ground plane 20. In some examples, the at least one resonator 50 has multiple galvanic connections to the antenna radiator 30. In some examples, the at least one resonator 50 has multiple galvanic connections to the ground plane 20.

In this example, the resonator 50 is coupled 51 (e.g. connected) to the antenna radiator 30 at a position of a current minimum for the first operational range of frequencies ΔF1 or a current minimum for the wanted range of frequencies ΔF1*w*. That is, the antenna radiator 30 for the range of frequencies ΔF1 (or ΔF1*w*) has an area where the electrical current is a minimum when excited at that range of frequencies ΔF1 (or ΔF1*w*). The resonator 50 is coupled 51 (e.g. connected) to the antenna radiator 30 at this region.

The space 60 between the ground plane 20 and the antenna radiator 30 occupied by the at least one resonator 50 has a height dimension h between the ground plane 20 and the antenna radiator 30 that is less than $1/20^{th}$ a wavelength corresponding to a center frequency of the first operational range of frequencies ΔF1.

In some examples, the space 60 between the ground plane 20 and the antenna radiator 30 occupied by the at least one resonator 50 has a height dimension h between the ground plane 20 and the antenna radiator 30 that is less than $1/20^{th}$ a wavelength corresponding to a highest frequency of the first operational range of frequencies ΔF1 or the wanted frequencies ΔF1*w*.

The resonator 50 is therefore a compact resonator that fits into a space 60 of small height.

Figure 4:
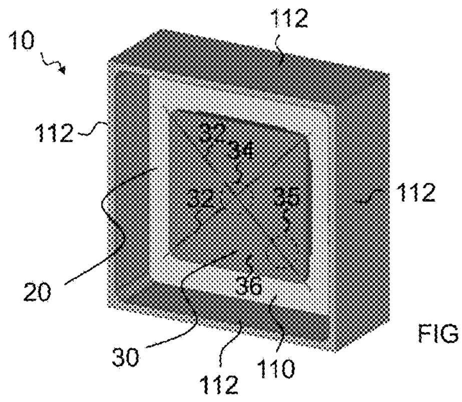
FIG. 4 shows another example of the subject matter described herein.

FIG. 4 illustrates an example of the antenna system 10 as described previously with reference to FIG. 2 (and/or FIG. 1).

The resonator 50 is coupled (e.g. connected) to the antenna radiator 30 at a position 34 closer to a center of the antenna radiator 30 than an edge of the antenna radiator 30. In this example, the resonator 50 is coupled (e.g. connected) to the antenna radiator 30 at a position 34 midpoint along a longest bi-sector 32 of the planar conductive portion 36.

In this particular example, the planar conductive portion 36 has a square or rectangular shape and the resonator 50 is coupled (e.g. connected) to the antenna radiator 30 at a position 34 midpoint along the longest bi-sectors 32 of the planar conductive portion 36. This is a centroid of the planar conductive portion 36. In some examples, the resonator 50 is coupled (e.g. connected) to the antenna radiator 30 at a position 34 midpoint along an axis of reflection symmetry of the planar conductive portion 36.

In examples where the planar conductive portion 36 is not square or rectangular in shape, the resonator 50 can be coupled (e.g. connected) to the antenna radiator 30 at the centroid of an area of the planar conductive portion 36, or any region of the antenna radiator 30 where a current distribution is zero or at near zero.

In some examples, the antenna radiator 30 may have other higher order modes which may or may not be utilized in the antenna design. Such higher order modes have different current/voltage distributions across the physical antenna radiator 30 which may in some examples provide additional current zero region(s) or alternative region(s) for coupling (or connection) other than the center of the physical antenna radiator 30. In some examples, the resonator 50 is used for similar purposes in a high order frequency range DF1.

In the examples, the feed 40 couples to the antenna radiator 30 at an off-center position 35. The resonator 50 couples to the antenna radiator 30 at central position 34. In this particular example, the planar conductive portion 36 has a square or rectangular shape and feed element 40 is coupled (e.g. connected) to the antenna radiator 30 at a position 35 offset from the midpoint 34 along the longest bi-sectors 32 of the planar conductive portion 36. At least one additional feed element 40 can be associated with each of the two different bi-sectors 32.

In other examples, the feed element 40 is coupled (e.g. connected) to the antenna radiator 30 at a position that is offset from a midpoint along an axis of reflection symmetry of the planar conductive portion 36. At least one additional feed element 40 can be associated with each of the two different axes of reflection symmetry.

In this example, the ground plane 20 is provided as part of a printed circuit board (PCB) 110. The feed network that is connected to the feed 40 can be provided by traces on the PCB 110.

Optionally, the antenna system 10 can additionally comprise conductive cavity walls 112. The cavity walls 112 are substantially planar and have normal vectors in a common plane. The cavity walls 112 form four sides of a partially open box. The box is closed on one side by the PCB 110 (ground plane 20) and is open on the other side. The boresight of the antenna system 10 can form a normal vector to the open side of the box and the ground plane 20.

FIGS. 5A, 5B, 6A, 6B illustrate examples of the antenna system 10 as described previously with reference to FIG. 4. However, the features described can be used with any of the preceding examples.

In these examples, the feed 40 couples to the antenna radiator 30 at an off-center position. The resonator 50 couples to the antenna radiator 30 at central position 34.

Figure 5A:
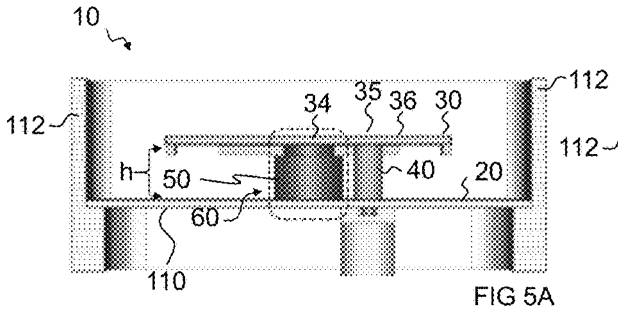
FIGS. 5A and 5B show another example of the subject matter described herein.
Figure 5B:
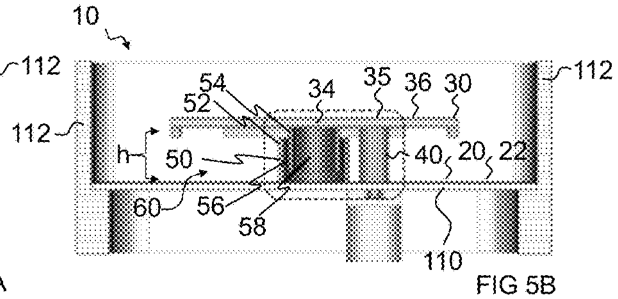

FIG. 5A illustrates a side, perspective view of a first example of an antenna system 10. FIG. 5B illustrates a side, cross-sectional view of the first example of the antenna system 10.

Figure 6A:
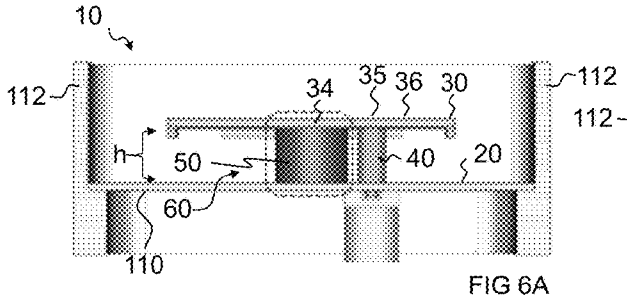
FIGS. 6A and 6B show another example of the subject matter described herein.
Figure 6B:
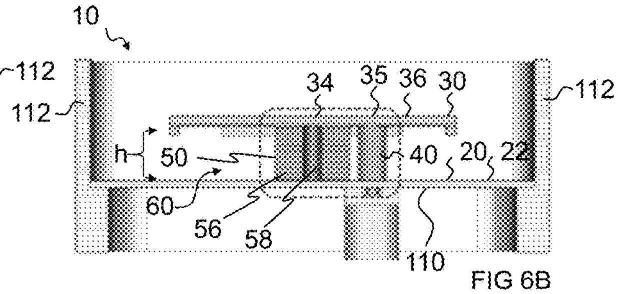

FIG. 6A illustrates a side, perspective view of a second example of an antenna system 10. FIG. 6B illustrates a side, cross-sectional view of the second example of the antenna system 10.

In both of these examples, the resonator 50 comprises an annulus (hollow cylinder) of dielectric 56.

In both of these examples, the resonator 50 also comprises a solid cylinder of dielectric 58. The solid cylinder of dielectric 58 is coaxial with, and has a smaller diameter, than the annulus of dielectric 56.

In the first example, the annulus of dielectric 56 is a dielectric gap, which may be air filled, between two partially overlapping, concentric hollow cylindrical conductors 52, 54 of different diameter. The solid cylinder of dielectric 58 is the hollow portion of the smaller diameter cylindrical conductor, which may be air filled.

In the second example, the resonator 50 is entirely dielectric without metallic or conductive parts. The annulus of dielectric 56 is a hollow cylinder of solid dielectric material (or materials) that interconnects the ground plane 20 and the antenna radiator 30. The dielectric 56 in this example has a high permittivity. The solid cylinder of dielectric 58 is the hollow portion of the cylindrical dielectric, which may be air filled. The hollow cylinder of solid dielectric material (or materials) 56 can be a single unitary structure.

In FIG. 5A, 5B, the resonator 50 is formed from a first conductive element 54 extending the antenna radiator 30 towards the ground plane 20 and a second conductive element 52 extending the ground plane 20 towards the antenna radiator 30. The second conductive element 52 is spatially separated from the first conductive element 54 by a dielectric gap 56.

The first conductive element 54 is cylindrical and has an axis of rotational symmetry that extends towards the ground plane 20, the second conductive element 52 is cylindrical and has an axis of rotational symmetry that extends towards the antenna radiator 30, and is coaxial with the axis of rotational symmetry of the first conductive element 54.

The first conductive element 54 is shaped substantially as a hollow cylinder having a first diameter and the second conductive element 52 is shaped substantially as a hollow cylinder having a second, different diameter.

The feed element 40 extends towards the antenna radiator 30 in a direction substantially parallel to a direction in which the first conductive element 54 extends the antenna radiator 30 and substantially parallel to a direction in which a second conductive element 52 extends the ground plane 20.

In FIG. 6A, 6B, the resonator 50 is formed from a unitary hollow cylinder of homogenous solid dielectric material. The solid dielectric hollow cylinder 56 has a cylindrical hollow air-filled core 58.

The antenna system 10 can be comprised in any suitable radio apparatus, for example a radio receiver, radio transmitter or radio transceiver. The radio apparatus can for example be a node of a radio telecommunications network, such as a cellular radio telecommunications network. The radio apparatus can for example be an access node such as a base station or access point. Examples of base stations include NodeBs in 3GPP such as e-NB and g-NB. The radio apparatus can for example be a terminal node. Examples of terminal nodes include user equipment (which encompasses mobile equipment) in 3GPP. The antenna system 10 can, consequently be included in a portable electronic device to provide radio communication functionality of the radio apparatus. Examples of portable electronic devices include watches and other wearable devices, mobile telephones and other pocket-portable devices, tablet computers and other hand-portable touch screen devices, and laptops and other portable computing devices.

Figure 7A:
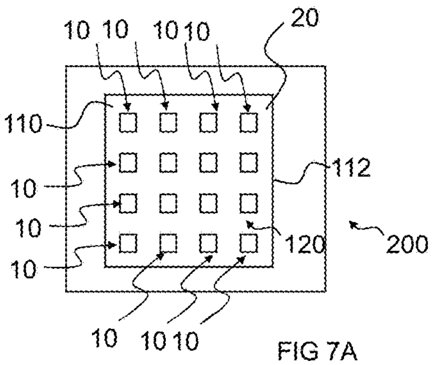
FIG. 7A shows another example of the subject matter described herein.
Figure 7B:
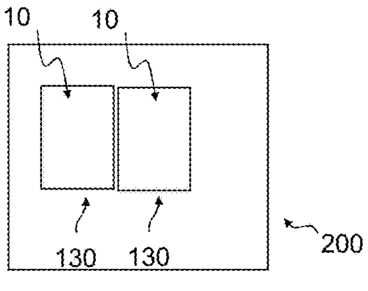
FIG. 7B shows another example of the subject matter described herein.

FIG. 7 illustrates an example in which a plurality of antenna systems 10 are arranged as an array 120. The array 120 of antenna systems 10 provides an array of antenna radiators 30 [not illustrated]. There is one antenna radiator 30 per antenna system 10 as previously described. The array of antenna systems 10 can, for example, be used for beam-steering or multiple-input multiple-output (MIMO) operation.

In the example illustrated the array comprises sixteen elements (sixteen antenna systems 10). In other examples the array can comprise 32, 64, 128 or more elements (antenna systems 10).

In some but not necessarily all examples, some or all of the antenna systems 10 forming the array 120 shares a common ground plane 20.

In some but not necessarily all examples, the walls 112 of the cavity can surround the array 120 rather than each individual antenna system 10.

The array 120 of antenna systems 10 can be comprised in any suitable radio apparatus 200, for example a radio receiver, radio transmitter or radio transceiver (as previously described).

The antenna systems 10 in the array 120 can, for example, operate at the same range of wanted frequencies $\Delta F1w$.

The use of the resonator 50 provides radio filtration at the antenna radiators 30 without requiring additional space for the array 120.

Also, radio frequency (RF) filtering requirements within a receiver, transmitter or transceiver design may have their RF system filtering requirements relaxed/reduced due to the additional filtering provided by the resonator 50. This may save space within the receiver, transmitter or transceiver circuitry and therefore within a radio frequency device/product.

FIG. 8 illustrates an example in which two radio systems 130 are located in a radio apparatus 200. One or both of the two radio systems 130 comprises at least one antenna system 10.

The two radio systems 130 operate at different operational frequency ranges. The radio apparatus 200 can be, for example, a dual band or multi band radio receiver, radio transmitter or radio transceiver (as previously described).

The antenna system(s) 10 of the different radio systems 130, operate at different non-overlapping ranges of wanted frequencies ΔF1*w*.

The use of the resonator 50 provides isolation between the different radio systems without requiring additional space.

Where a structural feature has been described, it may be replaced by means for performing one or more of the functions of the structural feature whether that function or those functions are explicitly or implicitly described.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An antenna system comprising:

a ground plane;

an antenna radiator separated from and overlapping the ground plane;

at least one feed element configured to provide a radio-frequency feed for the antenna radiator; and at least one resonator coupled to the feed element and positioned in a space between the ground plane and the antenna radiator, wherein the antenna radiator is a broadband antenna radiator having a first operational range of frequencies and the at least one resonator is a narrow band resonator having a second range of resonant frequencies that at least partially lie within the first operational range of frequencies, wherein the narrow band resonator causes the antenna system to have a narrower operational range of frequencies than the first operational range of frequencies, and wherein the at least one feed element passes through the ground plane without making galvanic contact with the ground plane and extends to the antenna radiator so as to either make galvanic contact with the antenna radiator or capacitively feed the antenna radiator.

2. An antenna system as claimed in claim 1, having, at the at least one feed, a gain that is lower for the second range of frequencies and higher for at least a portion of the first operational range of frequencies that does not overlap the second range of frequencies.

3. An antenna system as claimed in claim 1, wherein the at least one resonator is coupled to the antenna radiator at a position closer to a center of the antenna radiator than an edge of the antenna radiator.

4. An antenna system as claimed in claim 1, wherein the antenna radiator comprises a planar conductive portion and the at least one resonator is coupled to the antenna radiator at a position midpoint along a longest bi-sector of the planar conductive portion.

5. An antenna system as claimed in claim 1, wherein the resonator is coupled to the antenna radiator at a current minimum for the first operational range of frequencies.

6. An antenna system as claimed in claim 1, wherein the space between the ground plane and the antenna radiator occupied by the at least one resonator has a height dimension between the ground plane and the antenna radiator that is less than $\frac{1}{20}^{th}$ a wavelength corresponding to a center frequency of the first operational range of frequencies.

7. An antenna system as claimed in claim 1, wherein the at least one resonator is coupled between the ground plane and the antenna radiator.

8. An antenna system as claimed in claim 1, wherein the at least one resonator is configured for efficient filtering of unwanted frequencies close to wanted frequencies within the first operational range of frequencies, without adversely affecting efficiency of the antenna radiator at the wanted frequencies within the first operational range of frequencies.

9. An antenna system as claimed in claim 1, wherein the at least one resonator is configured as a bandstop resonator.

10. An antenna system as claimed in claim 1, wherein the at least one resonator reduces antenna gain at frequencies within the second range of resonant frequencies.

11. An antenna system as claimed in claim 1, wherein the at least one resonator comprises an annulus of dielectric.

12. An antenna system as claimed in claim 11, wherein the annulus of dielectric is a dielectric gap between two partially overlapping, concentric hollow cylindrical conductors of different diameter or is one hollow cylinder of dielectric material or materials that interconnects the ground plane and the antenna radiator.

13. An antenna system as claimed in claim 1, wherein the antenna radiator is a planar conductor and wherein the ground plane comprises a planar conductor, wherein a plane occupied by the planar conductor of the antenna radiator is parallel to a plane occupied by the planar conductor of the ground plane.

14. An antenna system as claimed in claim 1, wherein the antenna radiator is a patch antenna.

15. A radio network access node comprising one or more antenna systems, wherein at least one antenna system comprises:

a ground plane;

an antenna radiator separated from and overlapping the ground plane;

at least one feed element configured to provide a radio-frequency feed for the antenna radiator; and at least one resonator coupled to the at least one feed element and positioned in a space between the ground plane and the antenna radiator, wherein the antenna radiator is a broadband antenna radiator having a first operational range of frequencies and the at least one resonator is a narrow band resonator having a second range of resonant frequencies that at least partially lie within the first operational range of frequencies, wherein the narrow band resonator causes the antenna system to have a narrower operational range of frequencies than the first operational range of frequencies, and wherein the at least one feed element passes through the ground plane without making galvanic contact with the ground plane and extends to the antenna radiator so as to either make galvanic contact with the antenna radiator or capacitively feed the antenna radiator.

16. A radio access network node as claimed in claim 15, wherein the at least one antenna system has, at the at least one feed, a gain that is lower for the second range of frequencies and higher for at least a portion of the first operational range of frequencies that does not overlap the second range of frequencies.

17. A radio access network node as claimed in claim 15, wherein the at least one resonator of the at least one antenna system is coupled to the antenna radiator at a position closer to a center of the antenna radiator than an edge of the antenna radiator.

18. A radio access network node as claimed in claim 15, wherein the antenna radiator of the at least one antenna system comprises a planar conductive portion and the at least one resonator is coupled to the antenna radiator at a position midpoint along a longest bi-sector of the planar conductive portion.

19. A radio access network node as claimed in claim 15, wherein the resonator of the at least one antenna system is coupled to the antenna radiator at a current minimum for the first operational range of frequencies.

20. A portable electronic device comprising one or more antenna systems, wherein at least one antenna system comprises:

a ground plane;

an antenna radiator separated from and overlapping the ground plane;

at least one feed element configured to provide a radio-frequency feed for the antenna radiator; and at least one resonator coupled to the at least one feed element and positioned in a space between the ground plane and the antenna radiator, wherein the antenna radiator is a broadband antenna radiator having a first operational range of frequencies and the resonator is a narrow band resonator having a second range of resonant frequencies that at least partially lie within the first operational range of frequencies, wherein the narrow band resonator causes the at least one antenna system to have a narrower operational range of frequencies than the first operational range of frequencies, and wherein the at least one feed element passes through the ground plane without making galvanic contact with the ground plane and extends to the antenna radiator so as to either make galvanic contact with the antenna radiator or capacitively feed the antenna radiator.

* * * * *